Nov. 10, 1931.  J. N. OVERTOOM  1,831,542
MUD SHOE FOR AUTO TIRES
Filed April 4, 1930  3 Sheets-Sheet 1
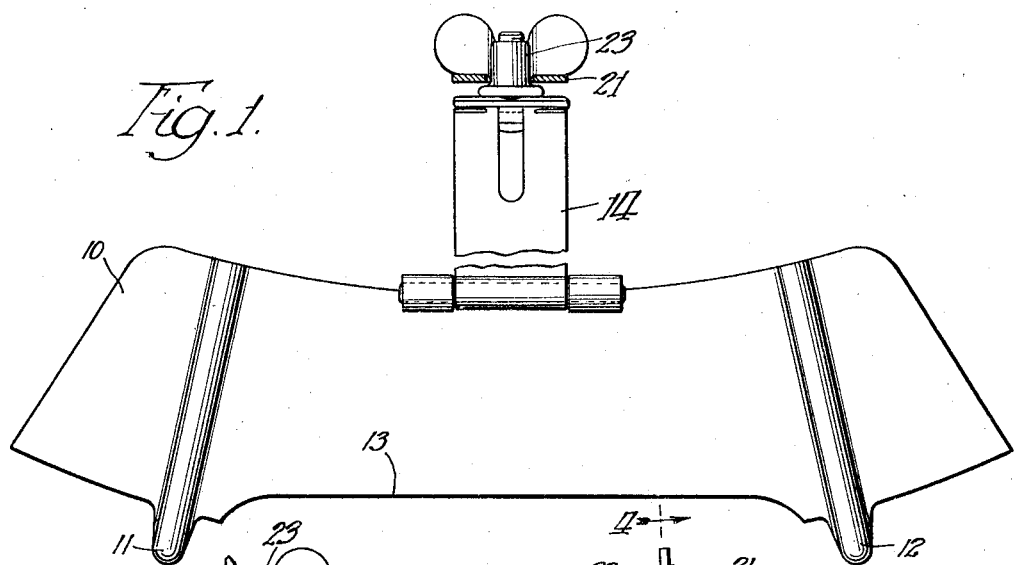
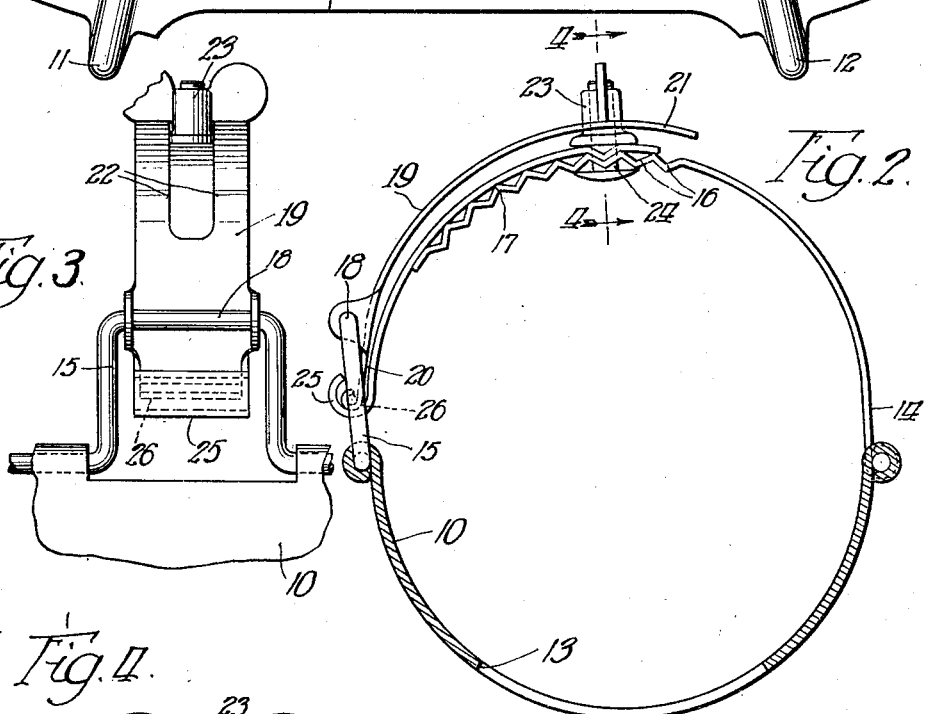
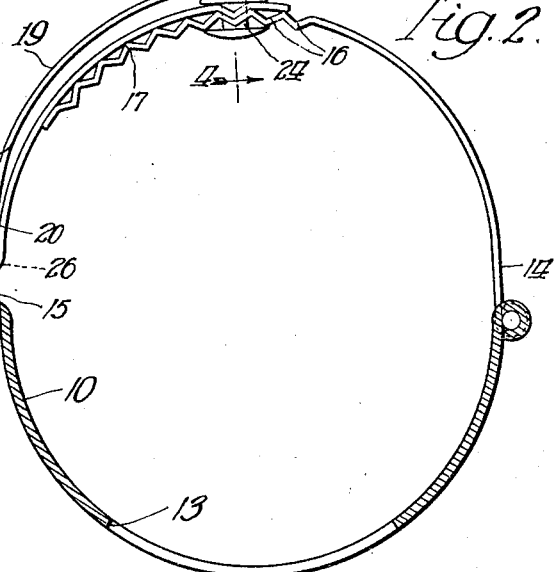
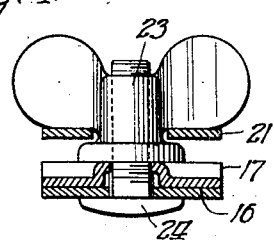
Inventor
John N. Overtoom
By: Zabel & Banning Attys.

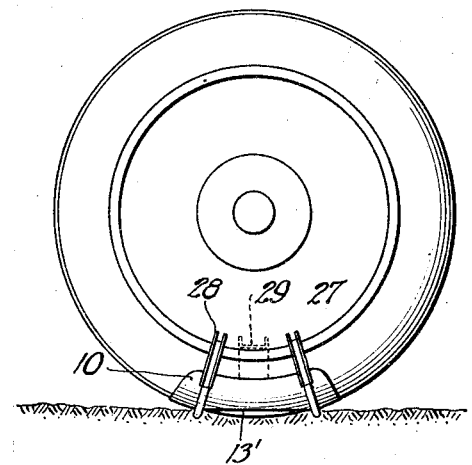
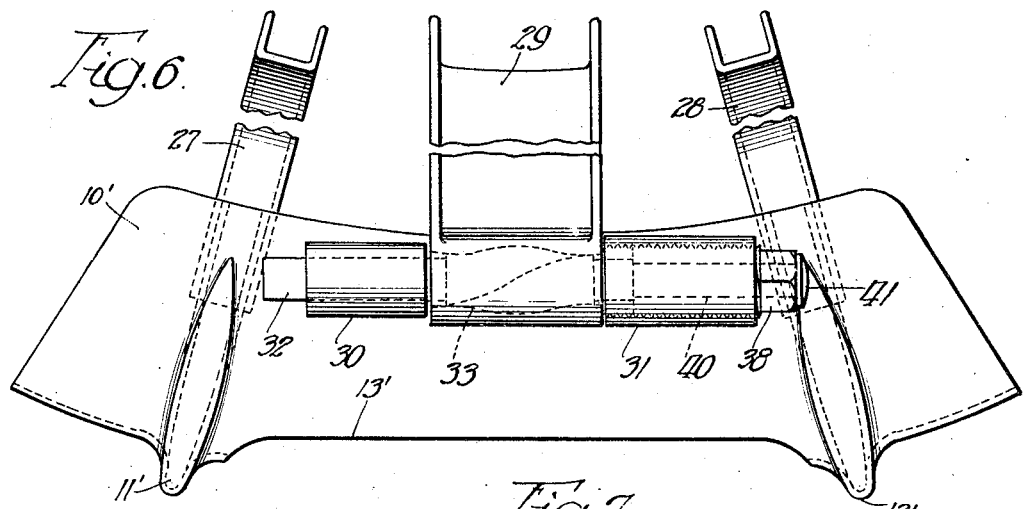
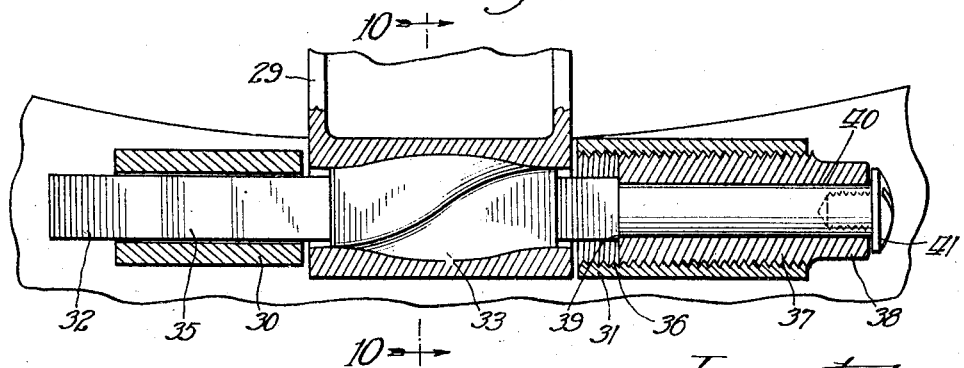

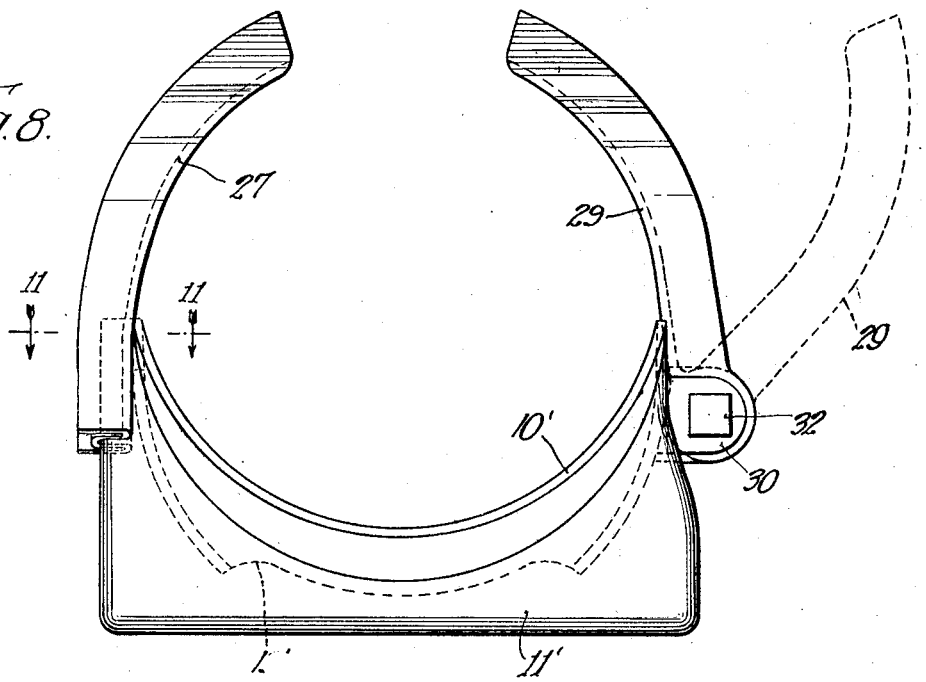
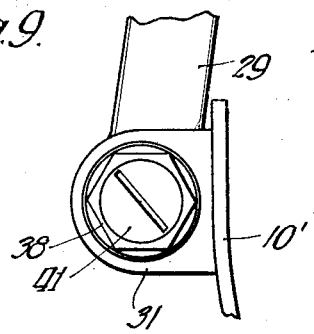
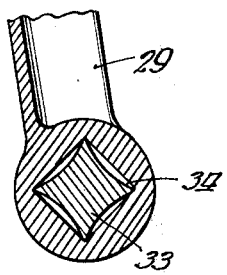
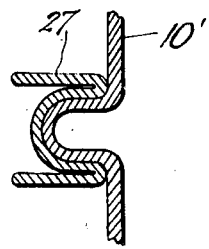
Inventor
John N. Overtoom
By Jabel & Banning Attys.

Patented Nov. 10, 1931

1,831,542

UNITED STATES PATENT OFFICE

JOHN N. OVERTOOM, OF HARVEY, ILLINOIS

MUD SHOE FOR AUTO TIRES

Application filed April 4, 1930. Serial No. 441,533.

My invention relates to mud shoes or blocks for application to vehicle tires in order to enable them to obtain a good grip for traction purposes in soft material such as mud or snow.

The principal purpose of this invention is to provide a device of this character having a plurality of lugs with means on the shoe for preventing the space between the lugs becoming clogged or filled so as to reduce the effect of the lugs in obtaining a grip in the soft bearing surface.

It is also a purpose of this invention to provide a novel means for attaching the shoe to a wheel which will enable it to be quickly placed thereon without the use of chains or locks and readily removed with a minimum amount of trouble.

I will describe my invention as applied to wheels of the spoke type and the disk type by reference to the accompanying drawings wherein—

Fig. 1 is a side view of the type employed on wheels of the spoke or artillery type;

Fig. 2 is an end view of the same device;

Fig. 3 is an enlarged detail view taken from the left of Fig. 2 showing the tightening means for clamping the shoe upon the wheel;

Fig. 4 is an enlarged section on the line 4—4 of Fig. 2;

Fig. 5 is a side view of a disk wheel showing the application of my invention thereto;

Fig. 6 is an enlarged side view of the mud shoe used for disk wheels;

Fig. 7 is an enlarged longitudinal section of the clamping member used on the shoe shown in Fig. 6;

Fig. 8 is an end view of the shoe shown in Fig. 6;

Fig. 9 is an enlarged detail of a portion of the locking mechanism;

Fig. 10 is a section on the line 10—10 of Fig. 7; and

Fig. 11 is an enlarged section taken on the line 11—11 of Fig. 8.

Referring now in detail to the drawings, the type of mud shoe shown in Figs. 1 to 4 consists of a metallic portion 10 shaped to the general contour of the outer portion of an automobile tire and having pressed outwardly a pair of ribs 11 and 12 adjacent its opposite ends which ribs form the gripping lugs for gripping into the soft mud or snow to aid the tractive effort of the wheel. Intermediate the lugs 11 and 12, the shoe is cut away along the line 13 so as to permit a portion of the tire to project through the shoe.

The purpose of this cut-away portion which is also shown in Figs. 5, 6, and 8 at 13' is to permit a portion of the flexible tire to be exposed between the traction legs. This portion of the tire, being resilient and not being rigid with the shoe, forms a very useful function in maintaining the shoe in proper condition to perform most efficiently. The soft tire in passing into and out of contact with the bearing surface below is, due to the weight of the car, alternately compressed and expanded which has the effect of loosening any mud or snow that may catch between the lugs 11 and 12 so as to cause it to fall off before the lugs again come into contact with the bearing surface thus leaving the space between the lugs free of any caked mud or snow that would destroy the efficiency of the lugs for tractive purpose.

The manner of attaching the device shown in Figs. 1 to 4 to the wheel consists in providing at opposite sides of the shoe pivoted members 14 and 15, the member 14 consisting of a metal strap curved as indicated in Fig. 2 so as to extend over the wheel rim between the spokes. The end portion of the member 14 is provided with a number of depressions such as indicated at 16 to receive a corresponding tooth on a member 17 for clamping the device to the wheel. The member 15 is bent upwardly and U-shaped as shown in Fig. 3 and has pivoted to the base 18 thereof the tightening member 19 which has a portion 20 extending downwardly below its pivot point and has a free end portion 21 extending upwardly over the center of the shoe where it is bifurcated as at 22 so that, when the wing nut 23 on bolt 24 which clamps the members 14 and 17 together is turned with the wings in line with the bifurcation 22, it permits the member 21 to pass down over the nut a sufficient distance to allow the wings to clear it when the nut is rotated a quarter turn further.

When the nut is rotated into this position as shown in Figs. 1 to 4, it is obvious that the wings engaging the bifurcations 22 holds the tightening member 19 in position as shown in Fig. 2.

Member 17 has its lower end curved as shown at 25 so as to form a bearing for the free end of the extension 20 of member 19, and it will readily be seen that the curled-up end 26 of the portion 21 will press downwardly on the bearing 25 drawing it closer to the pivot of the member 15 and thus reduce the circumference of the clamp so as to cause it to grip the wheel rim.

Referring now to Figs. 5 to 11, in this form the shoe 10' again has the legs 11' and 12' preferably formed up from the metal in the same manner as the legs 11 and 12 and welded or otherwise secured to the lugs of a pair of upwardly projecting arms 27 and 28 adapted to engage one side of the disk wheel. The clamping means for engaging the other side of the disk wheel consists of an arm 29 which is secured in a manner to permit its turning toward and away from the wheel to the shoe by means of the brackets 30 and 31 and the turning shaft 32.

Shaft 32 has a centrally twisted portion 33 engaging in a corresponding twisted aperture 34 in the arm 29 so that, if the shaft 32 is slid endwise without being permitted to turn, the arm 29 must turn about the twisted portion 33. Shaft 32 has a squared section 35 in lug 30 so as to prevent its rotation, and lug 31 is interiorly screw-threaded as indicated at 36 to receive the exteriorly screw-threaded driving member 37 which member may be rotated by means of the polygonal head 38 thereon to move the shaft 32 endwise in either direction to thus turn the arm 29 into and out of wheel clamping position. Shaft 32 has the shouldered portion at 39 bearing against the inner end of the member 37 so that, the minute this member is moved to the left as shown in Fig. 7, it will force shaft 32 to the left. This shaft also has the cylindrical portion 40 passing through the member 37 so as to be rotatable therein provided with a bearing cap 41 screw-threaded into its end and overlapping the nut portion 38 so that, if the member 37 is rotated in a direction causing it to move to the right as shown in Fig. 7, it will bear against the member 41 and cause shaft 32 to also move to the right thereby swinging the arm 29 in the opposite direction.

This makes a very simple device for application to an automobile wheel, and, as will be readily apparent, the type shown in Figs. 5 to 11 for disk wheels may readily be used on other types of wheels as well although primarily designed for the disk wheels. The only tool necessary to apply the clamp in either instance is a wrench so that it is an easy matter to put on or take off this clamp.

Having thus described my invention, what I claim as new and desire to secure by Letters Patent is:

A traction device having a portion for fitting on the tread part of a tire on a wheel and having lug means projecting outwardly and means for securing said device to a wheel of disk or other type comprising clamping members projecting from opposite sides of said portion to receive the tire therebetween and means for drawing the free end portions of said members toward each other to grip the wheel therebetween, said last named means comprising a bar slidably secured to said portion, means connecting said bar and one of said members for causing swinging movement of the member by sliding movement of said bar, and means for sliding said bar.

In witness whereof, I hereunto subscribe my name this 13th day of March, A. D. 1930.

JOHN N. OVERTOOM.